US008611308B2

(12) United States Patent
Wang et al.

(10) Patent No.: US 8,611,308 B2
(45) Date of Patent: Dec. 17, 2013

(54) METHOD AND APPARATUS FOR USER HANDING OVER TO HOME NODEB

(75) Inventors: Jing Wang, Shenzhen (CN); Lanlan Li, Shenzhen (CN); Lin Liu, Shenzhen (CN); Di Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 140 days.

(21) Appl. No.: 13/203,479

(22) PCT Filed: Aug. 28, 2009

(86) PCT No.: PCT/CN2009/073624
§ 371 (c)(1), (2), (4) Date: Aug. 25, 2011

(87) PCT Pub. No.: WO2010/096977
PCT Pub. Date: Sep. 2, 2010

(65) Prior Publication Data

US 2011/0305221 A1 Dec. 15, 2011

(30) Foreign Application Priority Data

Feb. 25, 2009 (CN) .......................... 2009 1 0009454

(51) Int. Cl.
*G01R 31/08* (2006.01)

(52) U.S. Cl.
USPC ............................ 370/331; 370/436; 370/437

(58) Field of Classification Search
None
See application file for complete search history.

(56) References Cited

U.S. PATENT DOCUMENTS

2008/0293419 A1* 11/2008 Somasundaram et al. .... 455/437
2010/0035616 A1* 2/2010 Sebire .......................... 455/436
2010/0238799 A1* 9/2010 Sebire .......................... 370/225
2011/0305221 A1* 12/2011 Wang et al. .................. 370/331
2013/0003697 A1* 1/2013 Adjakple et al. ............. 370/331
2013/0023269 A1* 1/2013 Wang et al. .................. 455/436
2013/0028236 A1* 1/2013 Jung et al. .................... 370/331

FOREIGN PATENT DOCUMENTS

CN 101123577 A 2/2008
CN 101287294 A 10/2008
CN 101330737 A 12/2008

OTHER PUBLICATIONS

International Search Report for PCT/CN2009/073624 dated Dec. 3, 2009.

* cited by examiner

*Primary Examiner* — Robert Wilson
(74) *Attorney, Agent, or Firm* — Nixon Peabody LLP; Joseph Bach, Esq.

(57) ABSTRACT

A Method and apparatus for a user handing over to a home NodeB are provided. The method comprises the following steps: when the user initiates a handover procedure from a source NodeB to a target home NodeB, a target home NodeB gateway receiving a relocation request message from a mobility management unit of a core network; the target home NodeB gateway generating a user context for the user according to the relocation request message, allocating a user context identifier for the user context, and sending the user context identifier and the relocation request message to the target home NodeB; and when receiving a relocation request acknowledgement message replied by the target home NodeB, the target home NodeB gateway sending the relocation request acknowledgement message to the mobility management unit of the core network. The application of the above technical solution can ensure the handover of a user to a home NodeB which serves as a target NodeB successfully.

15 Claims, 14 Drawing Sheets

METHOD AND APPARATUS FOR USER HANDING OVER TO HOME NODEB

CROSS-REFERENCE TO RELATED APPLICATIONS

This application is a National Phase of International Application No. PCT/CN2009/073624, which was filed on Aug. 28, 2009, and which claims priority to and the benefit of Chinese Patent Application No. 200910009454.4, filed on Feb. 25, 2009, and the disclosures of which are hereby incorporated herein by reference in their entireties.

TECHNICAL FIELD OF THE INVENTION

The present invention relates to the communication field, and specifically, to a method and an apparatus for a user handing over to a home NodeB.

BACKGROUND OF THE INVENTION

A home NodeB is a small and low-power base station and deployed at indoor places such as homes and offices, and mainly aims at providing a higher service rate and lower fees required by high rate services for the users, and also makes up for the shortcomings in coverage of existing distributed cellular wireless communication systems. The home NodeB has advantages of benefits, convenience, low power output, plug and play, and etc.

The home NodeB accesses a core network via a logical network element, i.e. a home NodeB gateway, and as shown in FIG. 1, the home NodeB gateway mainly executes the following functions: verifying the security of the home NodeB, processing the registration of the home NodeB, performing working maintenance and management on the home NodeB, configuring and controlling the home NodeB according to the requirements of operators, and being in charge of exchanging data between the core network and the home NodeB. A user of the home NodeB needs to conduct relevant registration at the home NodeB gateway before using the home NodeB, and makes the gateway store context information of the user through a user registration flow, so that the home NodeB gateway performs management operations on the signaling message of the user. The registration process of a user of the home NodeB is shown in FIG. 2, specifically comprising the steps as follows.

S201, a user needs to establish an RRC (Radio Resource Control) connection as a bearer of the signaling message or service data before conducting communication.

S202, the user triggers the registration process through initializing an NAS (Non Access Stratum) message, and the message type can be an attachment message, a location/Routing area update message, a service request message and etc.

S203, the home NodeB does not find any context identifier information of the user and then sends a registration request message to the home NodeB gateway to register user information at the home NodeB gateway, and the contents of the message comprise information such as the type of the registration, the IMSI (International Mobile Subscriber Identify) identifier of the user, a home NodeB identifier, and etc.

S204, the home NodeB gateway verifies the ability of the user which accesses the home NodeB, if it allows the user to use resources provided by the home NodeB, accepts the registration, establishes a user context, and carries user context identifier information in a registration response message replied to the home NodeB.

S205, the home NodeB gateway transparently forwards an NAS message sent from the user to the core network without performing any processing on the message.

S206, the core network performs starting authentication and a security flow to verify the user according to the received NAS message.

S207, if the user passes the authentication and security verification, and the core network side performs corresponding specific operations according to the NAS message sent from the user, the core network side replies an NAS response message to the user to bring the information of the core network side to the user, this message is transparently transmitted between the user and the core network without being performed with any processing by the home NodeB and the home NodeB gateway.

It can be concluded from the above description that the prior art must perform user registration process to make the home NodeB and the home NodeB gateway obtain a user context identifier, and the home NodeB and the home NodeB gateway use this identifier to distinguish that a signaling transmitted at an RUA (RANAP User Adaptation) protocol layer belongs to RANAP (Radio Access Network Application Part) message of which user, and provide adaptation between an RANAP and an SCTP (Stream Control Transmission Protocol). However, when the user performs cell handover and the target cell is a home NodeB, as the user has never initiated any initialization NAS message in this cell, the target home NodeB and the target home NodeB gateway will not have the context identifier information of the user. Then a signaling message cannot be corresponded, and the handover procedure cannot be completed normally.

Currently no effective solutions have been put forward for the problem in the prior art that the handover procedure cannot be completed normally if a target cell is a home NodeB when a user performs cell handover.

SUMMARY OF THE INVENTION

The present invention provides method and apparatus for a user handing over to a home NodeB, to solve the problem in the prior art that the handover procedure cannot be completed normally if a target cell is a home NodeB when a user performs cell handover.

To achieve the object, according to one aspect of the present invention, a method for a user handing over to a home NodeB is provided.

The method for a user handing over to a home NodeB according to the present invention comprises:

A. when the user initiates a handover procedure from a source NodeB to a target home NodeB, a target home NodeB gateway receiving a relocation request message from a mobility management unit of a core network;

B. the target home NodeB gateway generating a user context for the user according to the relocation request message, allocating a user context identifier for the user context, and sending the user context identifier and the relocation request message to the target home NodeB; and C. when receiving a relocation request acknowledgement message replied by the target home NodeB, the target home NodeB gateway sending the relocation request acknowledgement message to the mobility management unit of the core network.

Step A comprises:

the source NodeB initiating the handover procedure according to a measurement report reported by the user; when the source NodeB is a macro base station, the source NodeB directly sending a relocation request message to the mobility management unit of the core network, and when the source NodeB is a home NodeB, the source NodeB sending a relocation request message to the mobiltiy management unit of the core network via a home NodeB gateway; and the mobility management unit of the core network sending the relocation request message, which carries a user permanent identifier added by the mobility management unit of the core network, to the target home NodeB gateway according to the relocation request message.

Step A also comprises:

the source NodeB initiating the handover procedure according to a measurement report reported by the user;

when the source NodeB is a macro base station, the source NodeB directly sending a relocation request message to the mobility management unit of the core network, and when the source NodeB is a home NodeB, the source NodeB sending a relocation request message to the mobiltiy management unit of the core network via a home NodeB gateway, wherein the relocation request message carries a user permanent identifier added by the source NodeB; and the mobility management unit of the core network sending the relocation request message to the target home NodeB gateway according to the received relocation request message.

In the two implementation manners of step A, in step B, the step of generating a user context for the user according to the relocation request message and allocating a user context identifier for the user context comprises: when the relocation request message carries the user permanent identifier, searching according to the user permanent identifier in the relocation request message, if the user has not performed registration, then generating the user context for the user, and allocating the user context identifier for the user context.

The above step A also comprises: the source NodeB initiating the handover procedure according to a measurement report reported by the user; when the source NodeB is a macro base station, the source NodeB directly sending a relocation request message to the mobility management unit of the core network, and when the source NodeB is a home NodeB, the source NodeB sending a relocation request message to the mobiltiy management unit of the core network via a home NodeB gateway; and the mobility management unit of the core network sending the relocation request message to the target home NodeB gateway according to the received relocation request message.

Based on this implementation manner of step A, in step B, the step of generating a user context for the user according to the relocation request message and allocating a user context identifier for the user context comprises: when the relocation request message does not carry a user permanent identifier, generating the user context for the user by using an Iu connection identifier in the relocation request message as a temporary user identifier, and allocating the user context identifier for the user context.

Based on the above techncial features, in step B, the step of sending the user context identifier and the relocation request message to the target home NodeB comprises: the target home NodeB gateway encapsulating the user context identifier information and the relocation request message in a radio access network application part user adaptation (RUA) connection message and sending the RUA connection message to the target home NodeB; or the target home NodeB gateway sending the user context identifier information to the target home NodeB via identifier allocation information newly defined at a home NodeB application protocol layer, encapsulating the relocation request message in an RUA connection message after receiving an identifier allocation acknowledgement message replied by the target home NodeB, and then sending the RUA connection message to the target home NodeB.

After step C, the method of the present invention further comprises the following step: the mobility management unit of the core network sending a relocation command to trigger the source NodeB to initiate a synchronization process from the user to the target home NodeB.

To achieve the above object, according to another aspect of the present invention, an apparatus for a user handing over to a home NodeB is provided.

The apparatus for a user handing over to a home NodeB according to the present invention comprises: a relocation request message receiving unit, configured to receive, when a user initiates a handover procedure from a source NodeB to a target home NodeB, a relocation request message sent from a mobility management unit of a core network to which the source NodeB belongs; a context identifier allocating unit, configured to generate a user context for the user according to the relocation request message received by the relocation request message receiving unit, allocate a user context identifier for the user context, and send the user context identifier and the relocation request message to the target home NodeB for processing; and a request acknowledgement message sending unit, configured to send a relocation request acknowledgement message to the mobility management unit of the core network when the relocation request acknowledgement message replied by the target home NodeB is received.

In the above, the context identifier allocating unit further comprises: an identifier information judging subunit, the first context identifier allocating subunit, the second context identifier allocating subunit and a message sending subunit, wherein, the identifier information judging subunit is configured to perform judgment according to the relocation request message sent from the relocation request message sending unit, trigger the first context identifier allocating subunit when the relocation request message carries a user permanent identifier, and trigger the second context identifier allocating subunit when the relocation request message does not carry a user permanent identifier; the first context identifier allocating subunit is configured to perform search according to the user permanent identifier in the relocation request message, and generate the user context for the user if the user has not performed registration and allocate the user context identifier for the user context; the second context identifier allocating subunit is configured to generate the user context for the user by using an Iu connection identifier in the relocation request message as a temporary user identifier and allocate the user context identifier for the user context; and the message sending subunit is configured to send the user context identifier and the relocation request message to the target home NodeB for processing.

The apparatus provided by the present invention further comprises: a synchronization process establishing unit, configured to send a relocation command via the mobility management unit of the core network to trigger the source NodeB to initiate a synchronization process from the user to the target home NodeB.

The method provided by the present invention successfully solves the following problem: when a user performs cell handover, if a target NodeB of the handover procedure is a home NodeB, signaling messages between the home NodeB and the home NodeB gateway cannot be corresponded as the home NodeB gateway lacks a user context identifier, and thus the handover procedure cannot be successfully performed, and the present invention ensures the handover procedure of a user between cells more fluent.

BRIEF DESCRIPTION OF ACCOMPANYING DRAWINGS

To describe the embodiments of the present invention or the technical solution in the prior art more clearly, drawings that need to be used in the embodiments or the prior art for explanation will be briefed hereinafter, and obviously, the drawings described hereinafter are just some embodiments of the present invention, and for those skilled in the art, other drawings can be obtained according to such drawings without inventive work.

DETAILED DESCRIPTION OF EMBODIMENTS

The technical solutions in the embodiments of the present invention will be described hereinafter clearly and completely in conjunction with the drawings in the embodiments of the present invention, and obviously, the described embodiments are just a part of, rather than all of, the embodiments of the present invention. Based on the embodiments of the present invention, all other embodiments reached by one skilled in the art without inventive work shall fall within the scope of protection of the present invention.

The present invention provide a method and an apparatus for a user handing over to a home NodeB, to solve the problem in the prior art that the handover procedure cannot be completed normally if a target cell is a home NodeB when a user performs cell handover.

Figure 1:
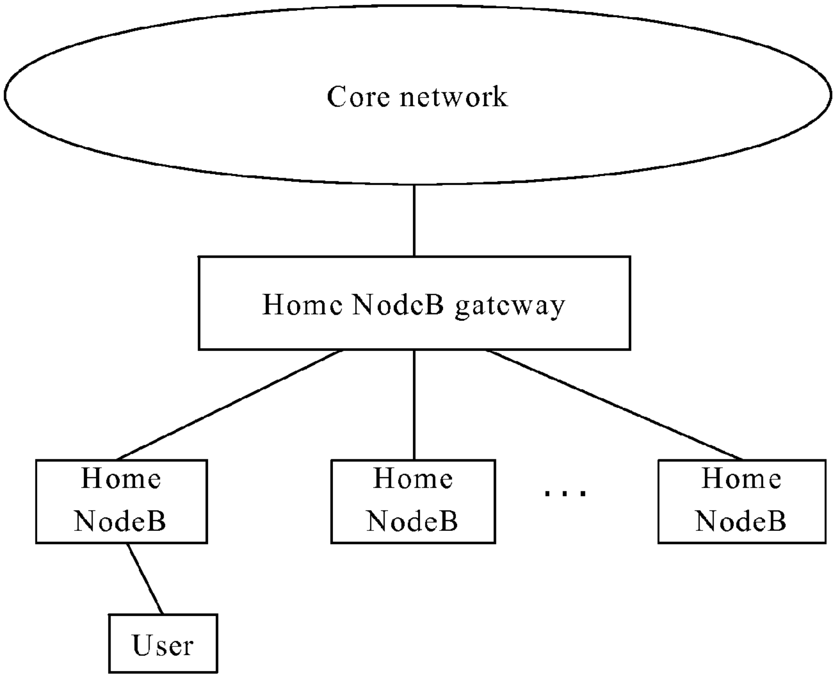
FIG. 1 is a block diagram of the connection structure of a home NodeB network in the related art.
Figure 2:
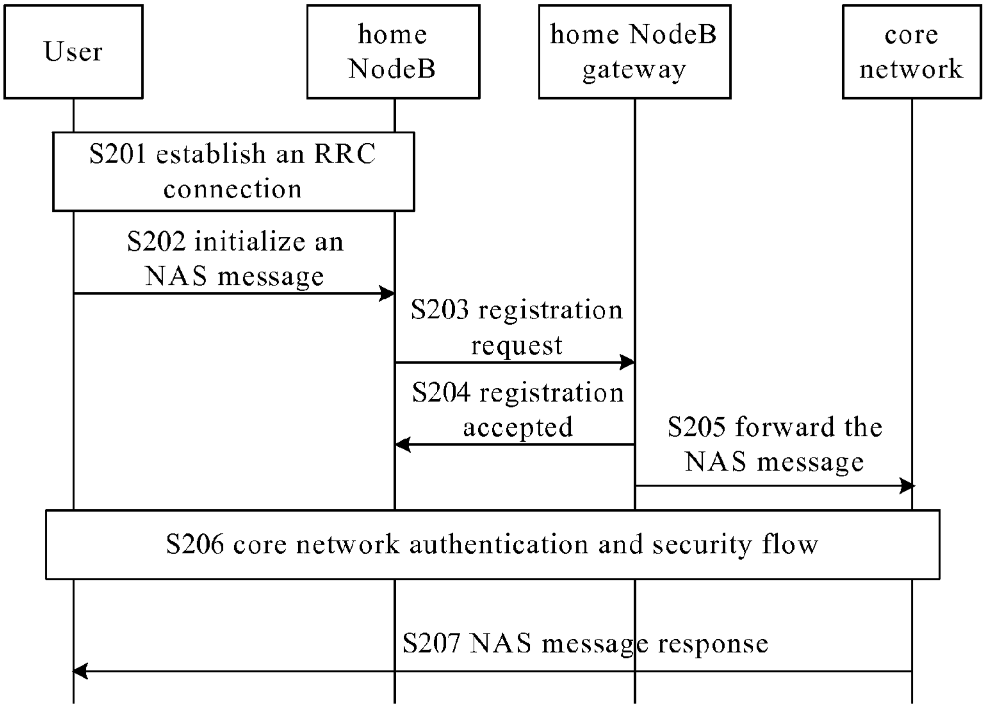
FIG. 2 is a flow chart of the registration process of a user of a home NodeB in the related art.
Figure 3:
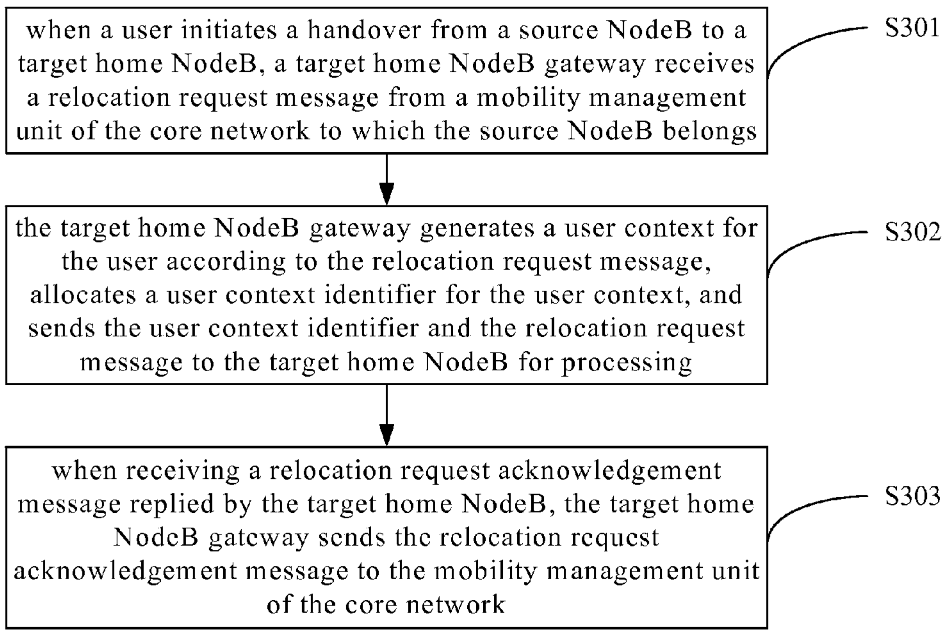
FIG. 3 is a flow chart of a method for a user handing over to a home NodeB provided by an embodiment of the present invention.

FIG. 3 is a flow chart of a method for a user handing over to a home NodeB provided by an embodiment of the present invention, and as shown in FIG. 3, the flow chart comprises the steps S301 to S303 as follows.

Step S301, when a user initiates a handover procedure from a source NodeB to a target home NodeB, a target home NodeB gateway receives a relocation request message from a mobility management unit of a core network.

The step specifically comprises:

(1) the source NodeB initiates the handover procedure according to a measurement report reported by the user; when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway; the mobility management unit of the core network sends the relocation request message to the target home NodeB gateway according to the relocation request message, wherein the message carries a user permanent identifier added by the mobility management unit of the core network. Or, (2) the source NodeB initiates the handover procedure according to a measurement report reported by the user; when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway, wherein the relocation request message carries a user permanent identifier added by the source NodeB; and the mobility management unit of the core network sends the relocation request message to the target home NodeB gateway according to the received relocation request message. Or, (3) the source NodeB initiates the handover procedure according to a measurement report reported by the user; when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway; and the mobility management unit of the core network sends the relocation request message to the target home NodeB gateway according to the received relocation request message.

Step S302, the target home NodeB gateway generates a user context for the user according to the relocation request message, allocates a user context identifier for the user context, and sends the user context identifier and the relocation request message to the target home NodeB.

When step S301 uses the above implementation manners (1) and (2), in this step, the process of generating a user context for the user according to the relocation request message and allocating a user context identifier for the user context specifically comprise: when the relocation request message carries the user permanent identifier, searching according to the user permanent identifier in the relocation request message, if the user has not performed registration, generating the user context for the user, and allocating the user context identifier for the user context.

When step S301 uses the above implementation manner (3), in this step, the process of generating a user context for the user according to the relocation request message and allocating a user context identifier for the user context specifically comprise: when the relocation request message does not carry the user permanent identifier, generating the user context for the user by using an Iu connection identifier in the relocation request message as a temporary user identifier, and allocating the user context identifier for the user context.

Specifically, in this step, the process of sending the user context identifier and the relocation request message to the target home NodeB specifically comprises: the target home NodeB gateway encapsulates user context identifier information and the relocation request message in a radio access network application part user adaptation (RUA) connection message and sending the RUA connection message to the target home NodeB; or the target home NodeB gateway sends user context identifier information to the target home NodeB via identifier allocation information newly defined in a home NodeB application protocol layer, encapsulates the relocation request message in a radio access network application part user adaptation (RUA) connection message after receiving an identifier allocation acknowledgement message replied by the target home NodeB, and then sends the RUA connection message to the target home NodeB.

Step S303, when receiving a relocation request acknowledgement message replied by the target home NodeB, the target home NodeB gateway sends the relocation request acknowledgement message to the mobility management unit of the core network.

Subsequent to this step, the method further comprises the following step: the mobility management unit of the core network sends a relocation command to trigger the source NodeB to initiate a synchronization process from the user to the target home NodeB.

The method provided by the present invention solves the following problem: when a user performs cell handover, if a target NodeB to be handed over to is a home NodeB, signaling messages between the home NodeB and the home NodeB gateway cannot be corresponded as the home NodeB gateway lacks a user context identifier, and thus the handover procedure cannot be successfully performed.

The specific implementation process of the method for a user handing over to a home NodeB provided by the present invention will be detailed hereinafter through several specific embodiments.

Embodiments 1-6 are embodiments showing the implementing manners of a user handing over from a macro base station to a target home NodeB.

Figure 4:
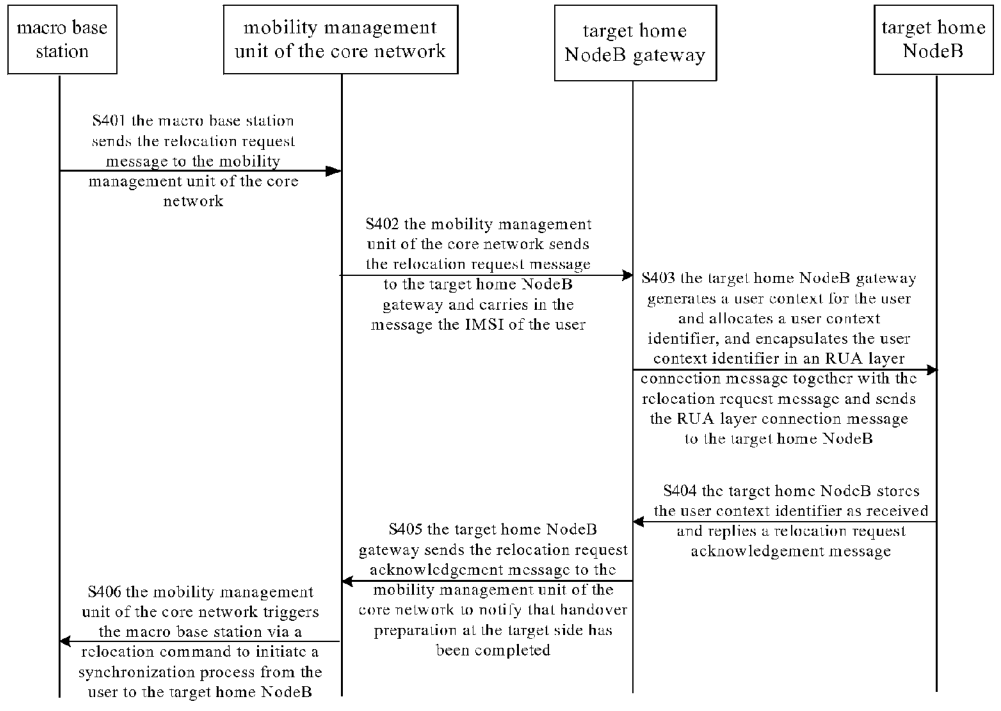
FIG. 4 is a flow chart of a method for a user handing over to a home NodeB provided by embodiment 1 of the present invention.

FIG. 4 is a flow chart of a method for a user handing over to a home NodeB provided by embodiment 1 of the present invention, and as shown in FIG. 4, the flow chart comprises the steps S401 to S406 as follows.

Step S401, the macro base station judges to initiate a handover flow according to a measurement report reported by the user and sends the relocation request message to the mobility management unit of the core network, wherein the relocation request message carries information such as a target NodeB identifier.

Step S402, after receiving the relocation request message, the mobility management unit of the core network makes judgment according to the target NodeB identifier information carried in the relocation request message, and if it finds that the target NodeB to be handed over to is a home NodeB, it carries the permanent identifier IMSI of the user in the relocation request message sent to the target home NodeB gateway.

It needs to be noted that the macro base station (or source home NodeB) and the target home NodeB in this embodiment and the following embodiments are managed by the same mobility management unit of the core network. When the macro base station and the target home NodeB are managed by different mobility management units of the core network, a source mobility management unit of the core network sends information, such as a user mobility management context, a bearer context and a target NodeB identifier, which is desired for completing the handover procedure, to a target mobility management unit of the core network by forwarding the relocation request message, and the target mobility management unit of the core network sends the relocation request message to the target home NodeB gateway according to the method in this step.

Step S403, the target home NodeB gateway performs search according to the user permanent identifier IMSI in the relocation request message, if it finds that the user has not performed registration, it generates a user context for the user and allocates a user context identifier for the user context, and encapsulates the user context identifier in an RUA connection message together with the relocation request message and sends the RUA connection message to the target home NodeB.

Step S404, the target home NodeB receives the RUA connection message and makes judgment according to the message, and when the target home NodeB does not have the context identifier of the user, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S405, the target home NodeB gateway receives the RUA direct transfer message and sends the relocation request acknowledgement message to the mobility management unit of the core network to notify that handover preparation at the target side has been completed.

Step S406, the mobility management unit of the core network triggers the macro base station via a relocation command to initiate a synchronization process from the user to the target home NodeB.

Figure 5:
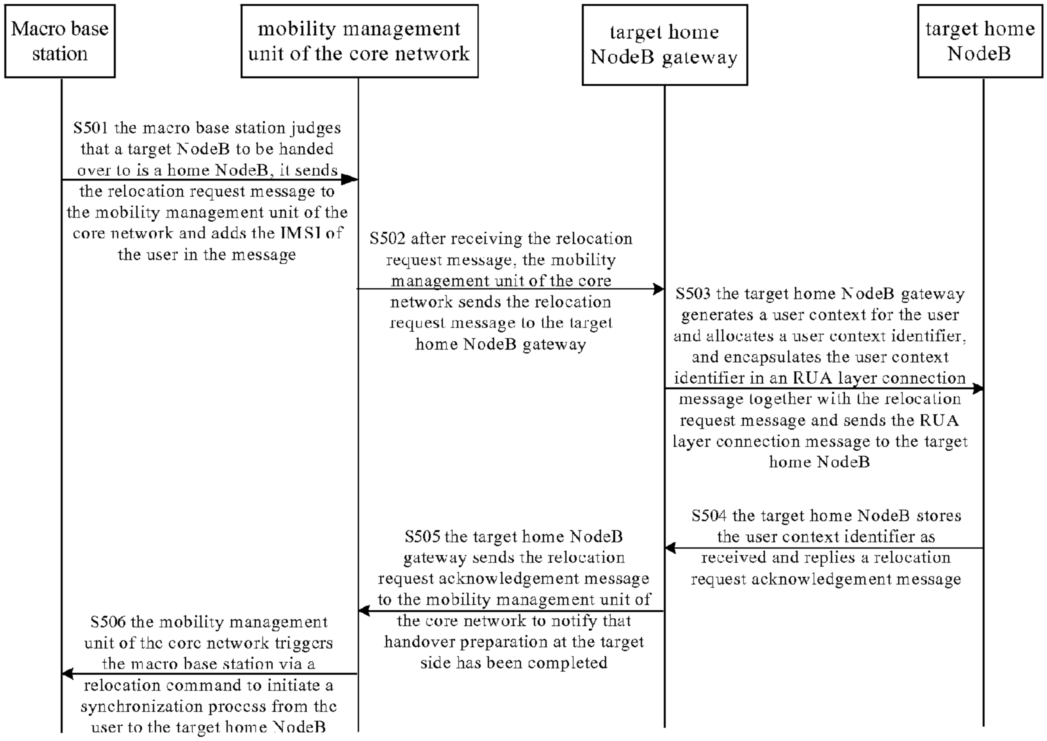
FIG. 5 is a flow chart of a method for a user handing over to a home NodeB provided by embodiment 2 of the present invention.

FIG. 5 is a flow chart of a method for a user handing over to a home NodeB provided by embodiment 2 of the present invention, and as shown in FIG. 5, the flow chart comprises the steps S501 to S506 as follows.

Step S501, the macro base station judges to initiate a handover flow according to a measurement report reported by the user, and when the macro base station is able to judge that a target NodeB to be handed over to is a home NodeB according to the configuration information of the target NodeB to be handed over to, it adds the permanent identifier IMSI of the user in the relocation request message sent to the mobility management unit of the core network. In the above, the relocation request message also carries information such as a target NodeB identifier.

Step S502, after receiving the relocation request message, the mobility management unit of the core network sends the relocation request message to the target home NodeB gateway.

Step S503, the target home NodeB gateway performs search according to the user permanent identifier IMSI in the relocation request message, if it finds that the user has not performed registration, it generates a user context for the user and allocates a user context identifier, and encapsulates the user context identifier in an RUA connection message together with the relocation request message and sends the RUA connection message to the target home NodeB.

Step S504, the target home NodeB receives the RUA connection message and makes judgment according to the message, and when the target home NodeB does not have the context identifier of the user, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S505, the target home NodeB gateway receives the RUA direct transfer message and sends the relocation request acknowledgement message to the mobility management unit of the core network to notify that handover preparation at the target side has been completed.

Step S506, the mobility management unit of the core network triggers the macro base station via a relocation command to initiate a synchronization process from the user to the target home NodeB.

Figure 6:
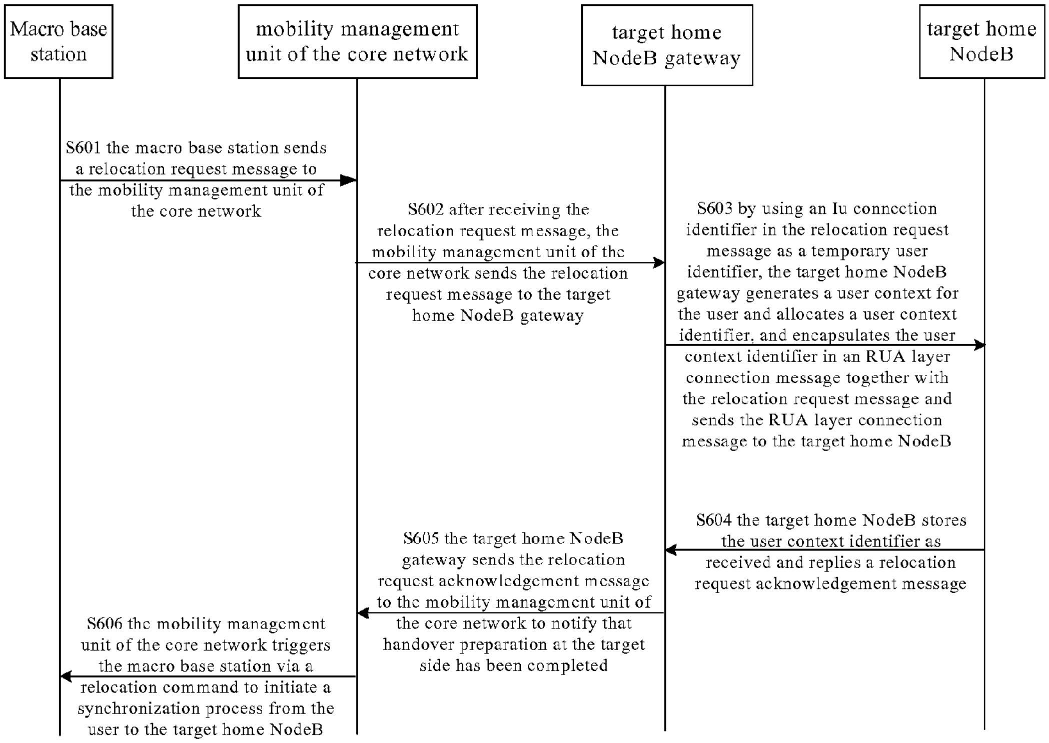
FIG. 6 is a flow chart of a method for a user handing over to a home NodeB provided by embodiment 3 of the present invention.

FIG. 6 is a flow chart of a method for a user handing over to a home NodeB provided by embodiment 3 of the present invention, and as shown in FIG. 6, the flow chart comprises the steps S601 to S606 as follows.

Step S601, the macro base station judges to initiate a handover flow according to a measurement report reported by the user and sends a relocation request message to the mobility management unit of the core network, wherein the relocation request message carries information such as a target NodeB identifier.

Step S602, after receiving the relocation request message, the mobility management unit of the core network sends a relocation request message to the target home NodeB gateway according to target NodeB identifier information carried in the relocation request message.

Step S603, by using an Iu connection identifier in the relocation request message as a temporary user identifier, the target home NodeB gateway generates a user context for the user and allocates a user context identifier, and encapsulates the user context identifier in an RUA connection message together with the relocation request message and sends the RUA connection message to the target home NodeB.

Step S604, the target home NodeB receives the RUA connection message and makes judgment according to the message, and when the target home NodeB does not have the context identifier of the user, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S605, the target home NodeB gateway receives the RUA direct transfer message and sends the relocation request acknowledgement message to the mobility management unit of the core network to notify that handover preparation at the target side has been completed.

Step S606, the mobility management unit of the core network triggers the macro base station via a relocation command to initiate a synchronization process from the user to the target home NodeB.

Figure 7:
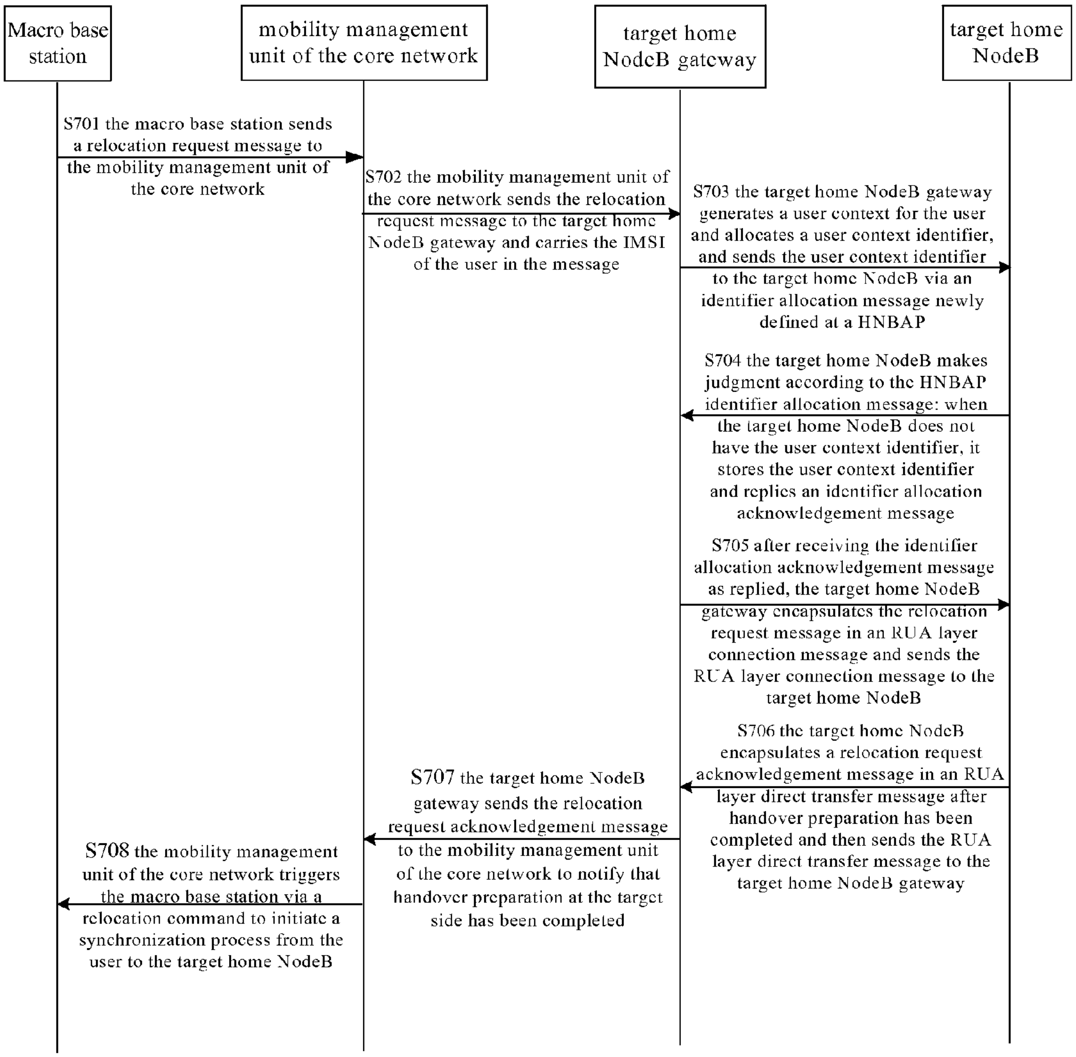
FIG. 7 is a flow chart of a method for a user handing over to a home NodeB provided by embodiment 4 of the present invention.

FIG. 7 is a flow chart of a method for a user handing over to a home NodeB provided by embodiment 4 of the present invention, and as shown in FIG. 7, the flow comprises the steps S701 to S708 as follows.

Step S701, the macro base station judges to initiate a handover flow according to a measurement report reported by the user and sends a relocation request message to the mobility management unit of the core network, wherein the relocation request message carries information such as a target NodeB identifier.

Step S702, after receiving the relocation request message, the mobility management unit of the core network makes judgment according to the target NodeB identifier information carried in the relocation request message, and if it finds that a target NodeB to be handed over to is a home NodeB, it carries the permanent identifier IMSI of the user in the relocation request message sent to the target home NodeB gateway.

Step S703, the target home NodeB gateway performs search according to the user permanent identifier IMSI in the relocation request message, if it finds that the user has not performed registration, it generates a user context for the user and allocates a user context identifier, and sends the identifier to the target home NodeB via an identifier allocation message newly defined at an HNBAP (HNB Application Part).

Step S704, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S705, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S706, the target home NodeB receives the RUA connection message, and encapsulates a relocation request acknowledgement message in an RUA direct transfer message after handover preparation has been completed and then sends the RUA direct transfer message to the target home NodeB gateway. In the above, the RUA direct transfer message carries a user context identifier already allocated for distinguishing the message.

Step S707, the target home NodeB gateway receives the RUA direct transfer message, and sends the relocation request acknowledgement message to the mobility management unit of the core network to notify that handover preparation at the target side has been completed.

Step S708, the mobility management unit of the core network triggers the macro base station via a relocation command to initiate a synchronization process from the user to the target home NodeB.

Figure 8:
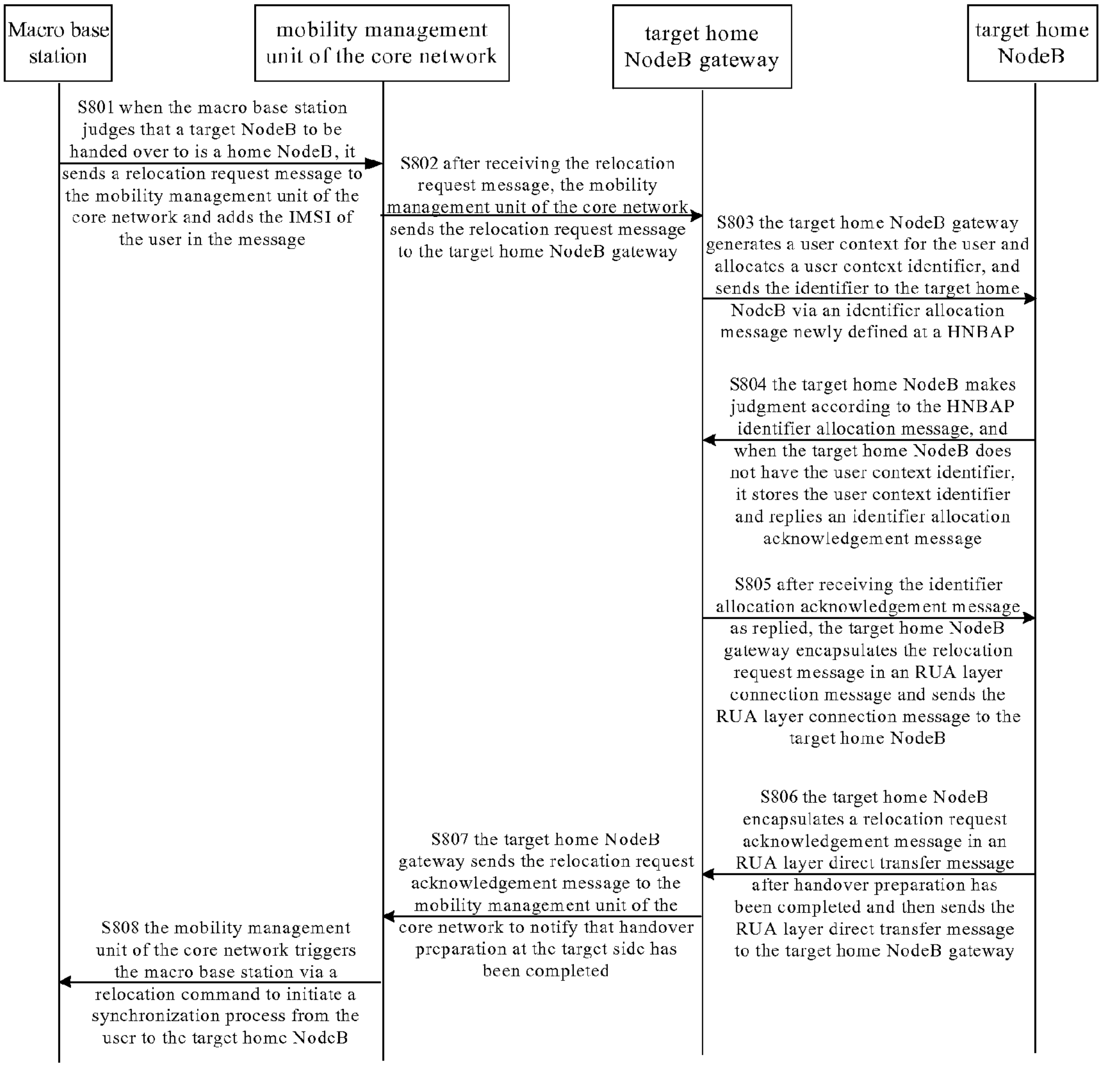
FIG. 8 is a flow chart of a method for a user handing over to a home NodeB provided by embodiment 5 of the present invention.

FIG. 8 is a flow chart of a method for a user handing over to a home NodeB provided by embodiment 5 of the present invention, and as shown in FIG. 8, the flow comprises the steps S801 to S808 as follows.

Step S801, the macro base station judges to initiate a handover flow according to a measurement report reported by the user, and when the macro base station is able to judge that a target NodeB to be handed over to is a home NodeB according to the configuration information of the target NodeB to be handed over to, it adds the permanent identifier IMSI of the user in the relocation request message sent to the mobility management unit of the core network. In the above, the relocation request message also carries information such as a target NodeB identifier.

Step S802, after receiving the relocation request message, the mobility management unit of the core network sends the relocation request message to the target home NodeB gateway.

Step S803, the target home NodeB gateway performs search according to the user permanent identifier IMSI in the relocation request message, if it finds that the user has not performed registration, it generates a user context for the user and allocates a user context identifier, and sends the identifier to the target home NodeB via an identifier allocation message newly defined at an HNBAP layer.

Step S804, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S805, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S806, the target home NodeB receives the RUA connection message, and encapsulates a relocation request acknowledgement message in an RUA direct transfer message after handover preparation has been completed and then sends the RUA direct transfer message to the target home NodeB gateway. In the above, the RUA direct transfer message carries a user context identifier already allocated for distinguishing the message.

Step S807, the target home NodeB gateway receives the RUA direct transfer message, and sends the relocation request acknowledgement message to the mobility management unit of the core network to notify that handover preparation at the target side has been completed.

Step S808, the mobility management unit of the core network triggers the macro base station via a relocation command to initiate a synchronization process from the user to the target home NodeB.

Figure 9:
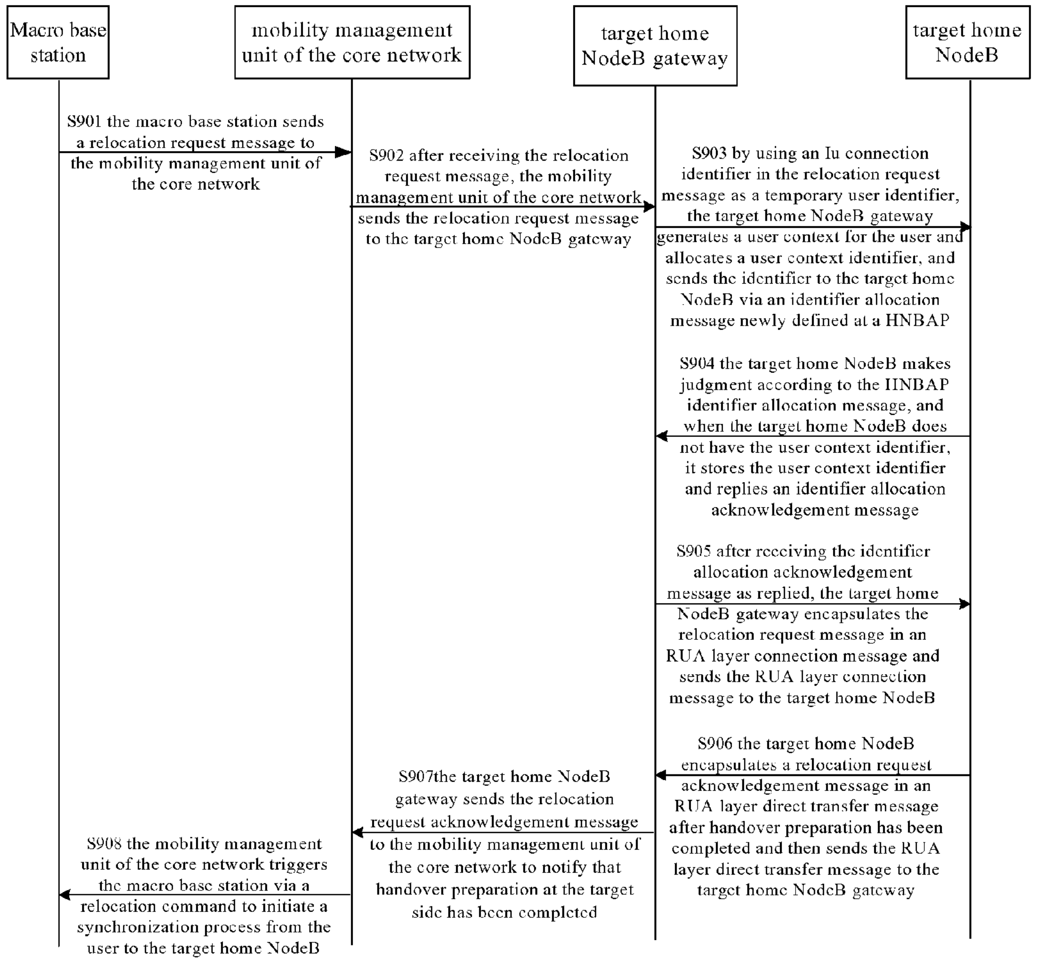
FIG. 9 is a flow chart of a method for a user handing over to a home NodeB provided by embodiment 6 of the present invention.

FIG. 9 is a flow chart of a method for a user handing over to a home NodeB provided by embodiment 6 of the present invention, and as shown in FIG. 9, the flow chart comprises the steps S901 to S908 as follows.

Step S901, the macro base station judges to initiate a handover flow according to a measurement report reported by the user and sends a relocation request message to the mobility management unit of the core network, wherein the relocation request message carries information such as a target NodeB identifier.

Step S902, after receiving the relocation request message, the mobility management unit of the core network sends the relocation request message to the target home NodeB gateway according to the target NodeB identifier information carried in the relocation request message.

Step S903, by using an Iu connection identifier in the relocation request message as a temporary user identifier, the target home NodeB gateway generates a user context for the user and allocates a user context identifier, and sends the identifier to the target home NodeB via an identifier allocation message newly defined at an HNBAP layer.

Step S904, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S905, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S906, the target home NodeB receives the RUA connection message, and encapsulates a relocation request acknowledgement message in an RUA direct transfer message after handover preparation has been completed and then sends the RUA direct transfer message to the target home NodeB gateway. In the above, the RUA direct transfer message carries a user context identifier already allocated for distinguishing the message.

Step S907, the target home NodeB gateway receives the RUA direct transfer message, and sends the relocation request acknowledgement message to the mobility management unit of the core network to notify that handover preparation at the target side has been completed.

Step S908, the mobility management unit of the core network triggers the macro base station via a relocation command to initiate a synchronization process from the user to the target home NodeB.

Embodiments 7-12 are implementation manners of a user handing over from a source home NodeB to a target home NodeB.

Figure 10:
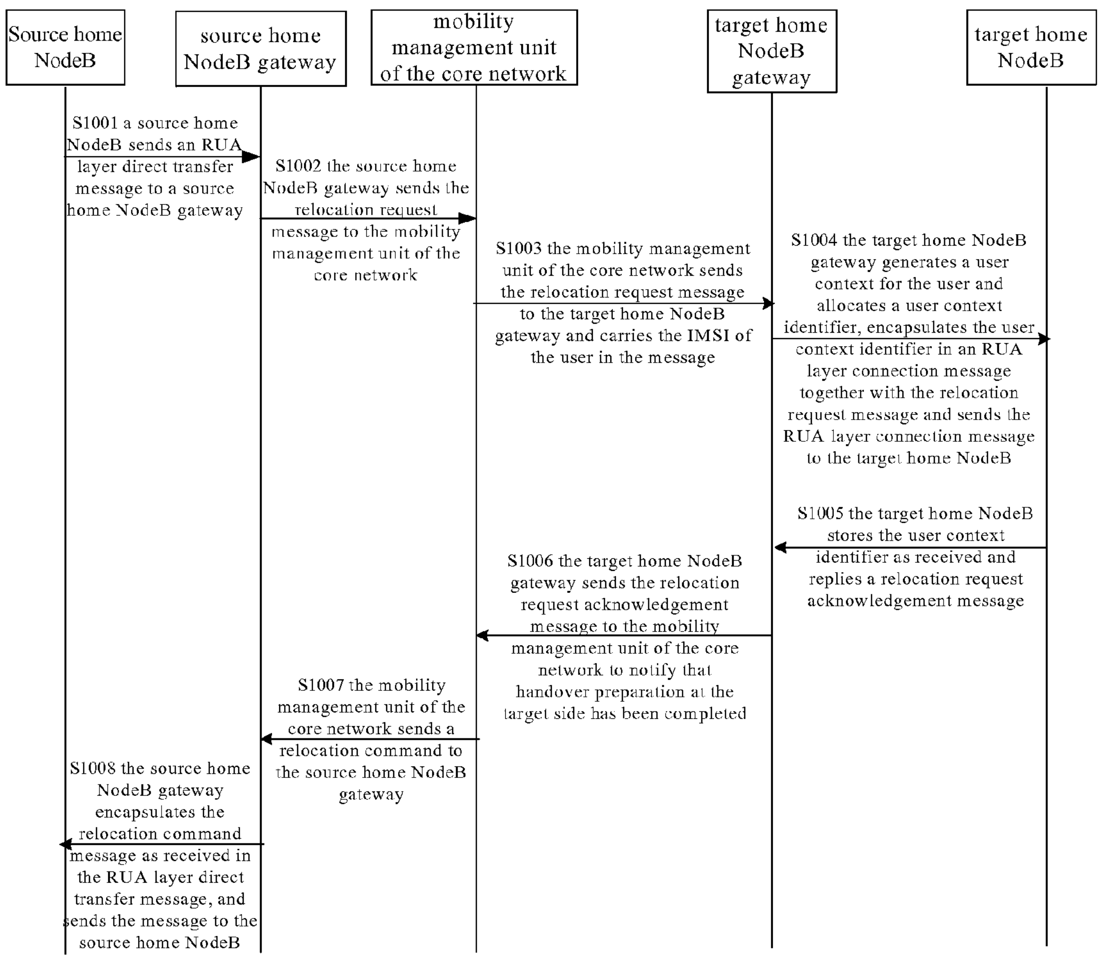
FIG. 10 is a flow chart of a method for a user handing over to a home NodeB provided by embodiment 7 of the present invention.

FIG. 10 is a flow chart of a method for a user handing over to a home NodeB provided by embodiment 7 of the present invention, and as shown in FIG. 10, the flow chart comprises the steps S1001 to S1008 as follows.

Step S1001, a source home NodeB judges to initiate a handover flow according to a measurement report reported by the user and sends an RUA direct transfer message to a source home NodeB gateway, wherein the RUA direct transfer message encapsulates an RANAP message therein which contains a relocation request message therein. In the above, the relocation request message carries information such as a target NodeB identifier.

Step S1002, the source home NodeB gateway receives the RUA direct transfer message, and sends the relocation request message therein to the mobility management unit of the core network.

Step S1003, after receiving the relocation request message, the mobility management unit of the core network makes judgment according to the target NodeB identifier information carried in the relocation request message, and if it finds that a target NodeB to be handed over to is a home NodeB, it carries the permanent identifier IMSI of the user in the relocation request message sent to the target home NodeB gateway.

Step S1004, the target home NodeB gateway performs search according to the user permanent identifier IMSI in the relocation request message, if it finds that the user has not performed registration, it generates a user context for the user and allocates a user context identifier, encapsulates the user context identifier in an RUA connection message together with the relocation request message and sends the RUA connection message to the target home NodeB.

Step S1005, the target home NodeB receives the RUA connection message and makes judgment according to the message, and when the target home NodeB does not have the user context identifier, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S1006, the target home NodeB gateway receives the RUA direct transfer message and sends the relocation request acknowledgement message to the mobility management unit of the core network to notify that handover preparation at the target side has been completed.

Step S1007, the mobility management unit of the core network sends a relocation command to the source home NodeB gateway.

Step S1008, the source home NodeB gateway encapsulates the relocation command message as received in the RUA direct transfer message, and sends the message to the source home NodeB to trigger the source home NodeB to initiate a synchronization process from the user to the target home NodeB.

Figure 11:
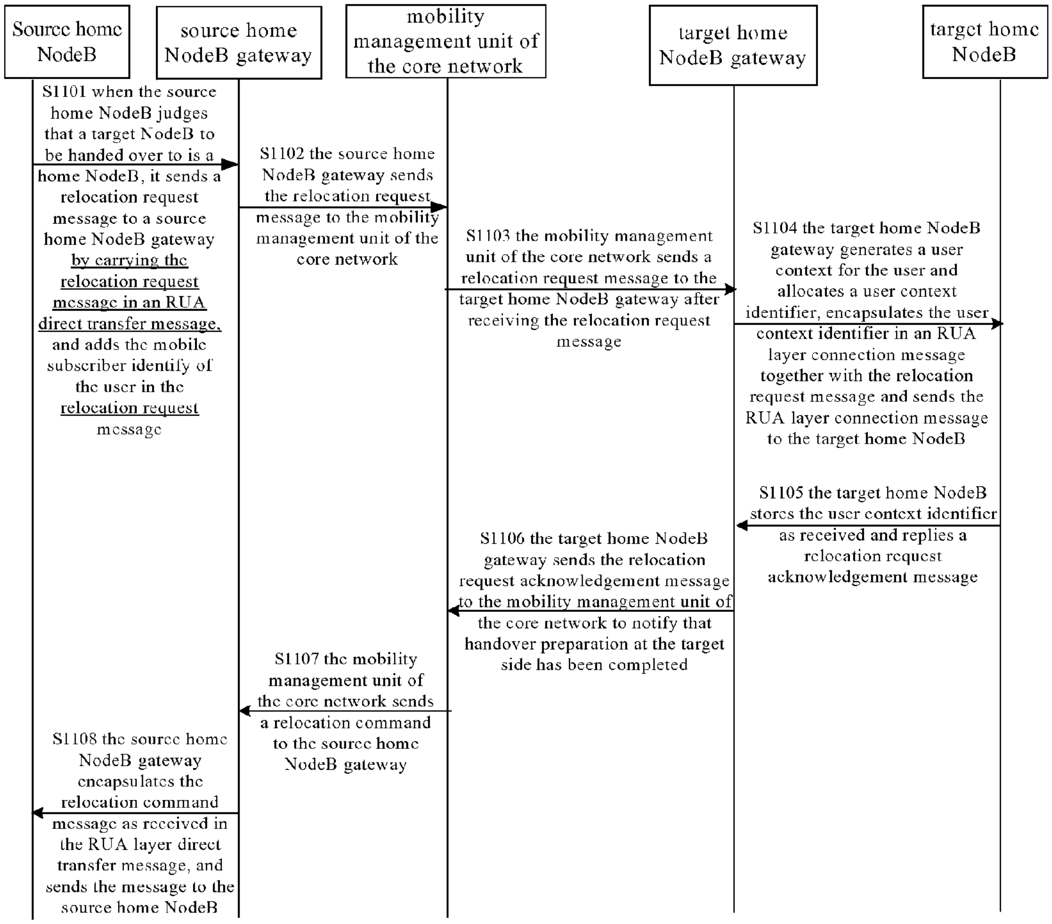
FIG. 11 is a flow chart of a method for a user handing over to a home NodeB provided by embodiment 8 of the present invention.

FIG. 11 is a flow chart of a method for a user handing over to a home NodeB provided by embodiment 8 of the present invention, and as shown in FIG. 11, the flow chart comprises the steps S1101 to S1108 as follows.

Step S1101, a source home NodeB judges to initiate a handover flow according to a measurement report reported by the user, and when the source home NodeB is able to judge that a target NodeB to be handed over to is a home NodeB according to the configuration information of the target NodeB to be handed over to, it adds the permanent identifier IMSI of the user in a relocation request message in an RUA direct transfer message sent to a source home NodeB gateway. In the above, the relocation request message also carries information such as a target NodeB identifier.

Step S1102, the source home NodeB gateway receives the RUA direct transfer message, and sends the relocation request message therein to the mobility management unit of the core network.

Step S1103, after receiving the relocation request message, the mobility management unit of the core network sends the relocation request message to the target home NodeB gateway.

Step S1104, the target home NodeB gateway performs search according to the user permanent identifier IMSI in the relocation request message, if it finds that the user has not performed registration, it generates a user context for the user and allocates a user context identifier, encapsulates the user context identifier in an RUA connection message together with the relocation request message and sends the RUA connection message to the target home NodeB.

Step S1105, the target home NodeB receives the RUA connection message and makes judgment according to the message, and when the target home NodeB does not have the user context identifier, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S1106, the target home NodeB gateway receives the RUA direct transfer message and sends the relocation request acknowledgement message to the mobility management unit of the core network to notify that handover preparation at the target side has been completed.

Step S1107, the mobility management unit of the core network sends a relocation command to the source home NodeB gateway.

Step S1108, the source home NodeB gateway encapsulates the relocation command message as received in the RUA direct transfer message, and sends the message to the source home NodeB to trigger the source home NodeB to initiate a synchronization process from the user to the target home NodeB.

Figure 12:
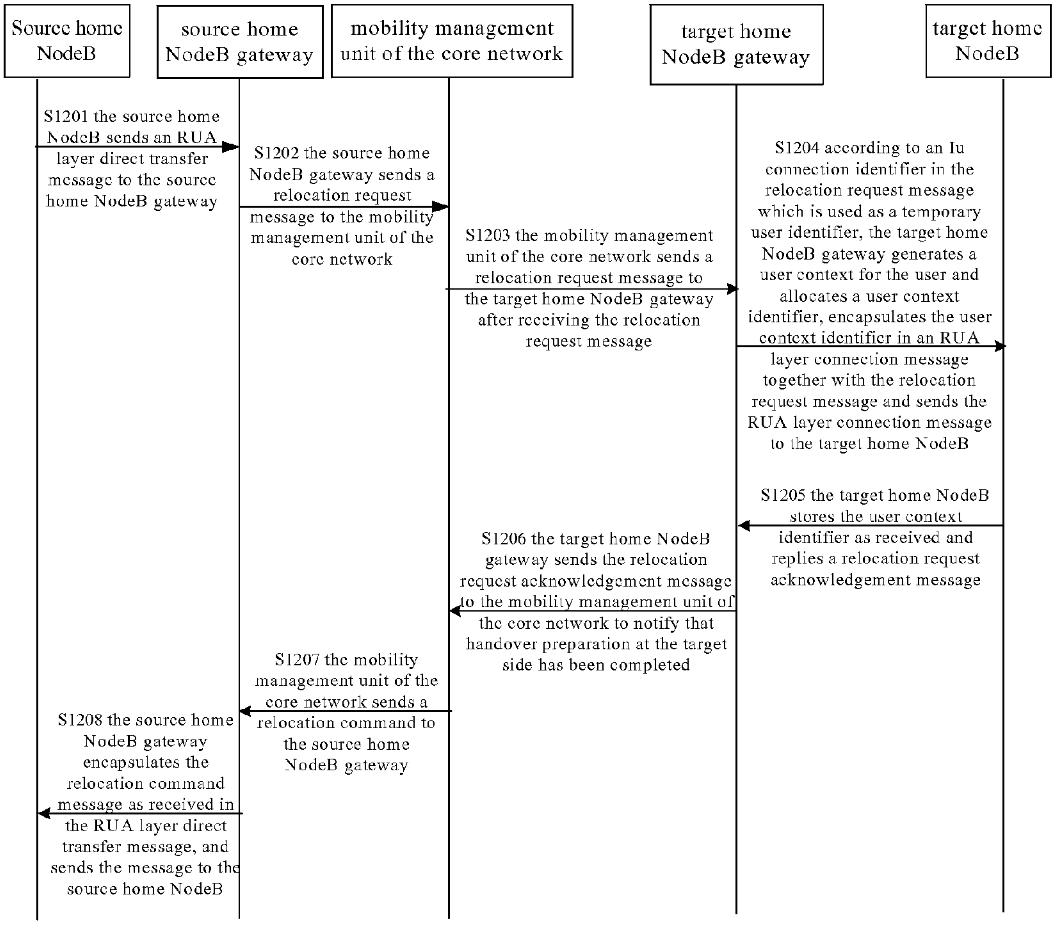
FIG. 12 is a flow chart of a method for a user handing over to a home NodeB provided by embodiment 9 of the present invention.

FIG. 12 is a flow chart of a method for a user handing over to a home NodeB provided by embodiment 9 of the present invention, and as shown in FIG. 12, the flow chart comprises the steps S1201 to S1208 as follows.

Step S1201, a source home NodeB judges to initiate a handover flow according to a measurement report reported by the user and sends an RUA direct transfer message to a source home NodeB gateway, wherein the RUA direct transfer message encapsulates therein an RANAP message which contains therein a relocation request message. In the above, the relocation request message carries information such as a target NodeB identifier.

Step S1202, the source home NodeB gateway receives the RUA direct transfer message, and sends the relocation request message therein to the mobility management unit of the core network.

Step S1203, after receiving the relocation request message, the mobility management unit of the core network sends the relocation request message to the target home NodeB gateway according to the target NodeB identifier information carried in the relocation request message.

Step S1204, by using an Iu connection identifier in the relocation request message as a temporary user identifier, the target home NodeB gateway generates a user context for the user and allocates a user context identifier, encapsulates the user context identifier in an RUA connection message together with the relocation request message and sends the RUA connection message to the target home NodeB.

Step S1205, the target home NodeB receives the RUA connection message and makes judgment according to the message, and when the target home NodeB does not have the user context identifier, it stores the user context identifier as received and replies a relocation request acknowledgement message. In the above, the relocation request acknowledgement message as replied is encapsulated in an RUA direct transfer message which also carries the user context identifier to distinguish the corresponding relationship between the message and the user.

Step S1206, the target home NodeB gateway receives the RUA direct transfer message and sends the relocation request acknowledgement message to the mobility management unit of the core network to notify that handover preparation at the target side has been completed.

Step S1207, the mobility management unit of the core network sends a relocation command to the source home NodeB gateway.

Step S1208, the source home NodeB gateway encapsulates the relocation command message as received in the RUA direct transfer message, and sends the message to the source home NodeB to trigger the source home NodeB to initiate a synchronization process from the user to the target home NodeB.

Figure 13:
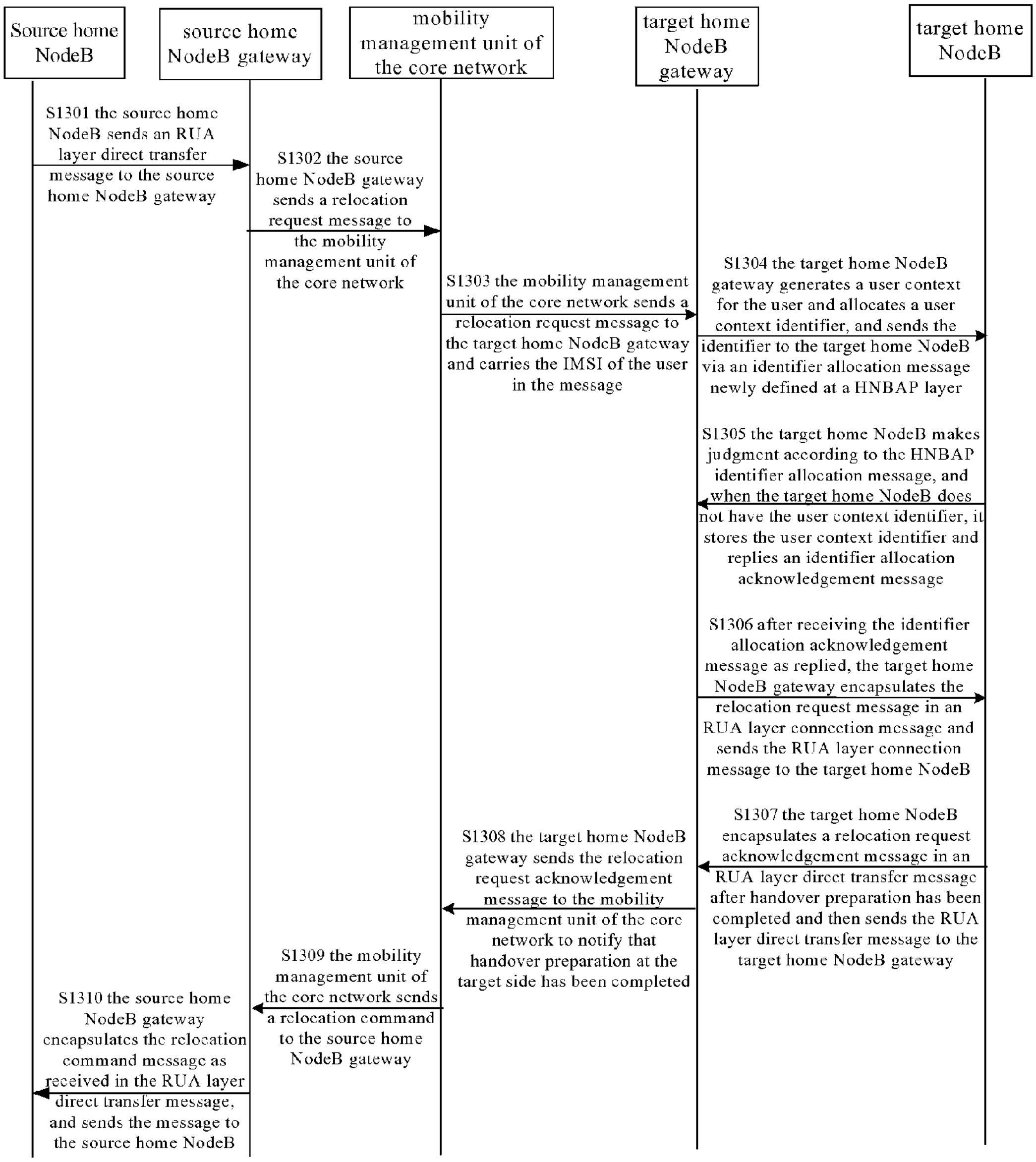
FIG. 13 is a flow chart of a method for a user handing over to a home NodeB provided by embodiment 10 of the present invention.

FIG. 13 is a flow chart of a method for a user handing over to a home NodeB provided by embodiment 10 of the present invention, and as shown in FIG. 13, the flow chart comprises the steps S1301 to S1310 as follows.

Step S1301, a source home NodeB judges to initiate a handover flow according to a measurement report reported by the user and sends an RUA direct transfer message to a source home NodeB gateway, wherein the RUA direct transfer message encapsulates therein an RANAP message which contains therein a relocation request message. In the above, the relocation request message carries information such as a target NodeB identifier.

Step S1302, the source home NodeB gateway receives the RUA direct transfer message, and sends the relocation request message therein to the mobility management unit of the core network.

Step S1303, after receiving the relocation request message, the mobility management unit of the core network makes judgment according to the target NodeB identifier information carried in the relocation request message, and if it finds that a target NodeB to be handed over to is a home NodeB, it carries the permanent identifier IMSI of the user in the relocation request message sent to the home NodeB gateway.

Step S1304, the target home NodeB gateway performs search according to the user permanent identifier IMSI in the relocation request message, if it finds that the user has not performed registration, it generates a user context for the user and allocates a user context identifier, and sends the identifier to the target home NodeB via an identifier allocation message newly defined at an HNBAP layer.

Step S1305, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S1306, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S1307, the target home NodeB receives the RUA connection message, and encapsulates a relocation request acknowledgement message in an RUA direct transfer message after handover preparation has been completed and then sends the RUA direct transfer message to the target home NodeB gateway. In the above, the RUA direct transfer message carries a user context identifier already allocated for distinguishing the message.

Step S1308, the target home NodeB gateway sends the relocation request acknowledgement message to the mobility management unit of the core network to notify that handover preparation at the target side has been completed.

Step S1309, the mobility management unit of the core network sends a relocation command to the source home NodeB gateway.

Step S1310, the source home NodeB gateway encapsulates the relocation command message as received in the RUA direct transfer message, and sends the message to the source home NodeB to trigger the source home NodeB to initiate a synchronization process from the user to the target home NodeB.

Figure 14:
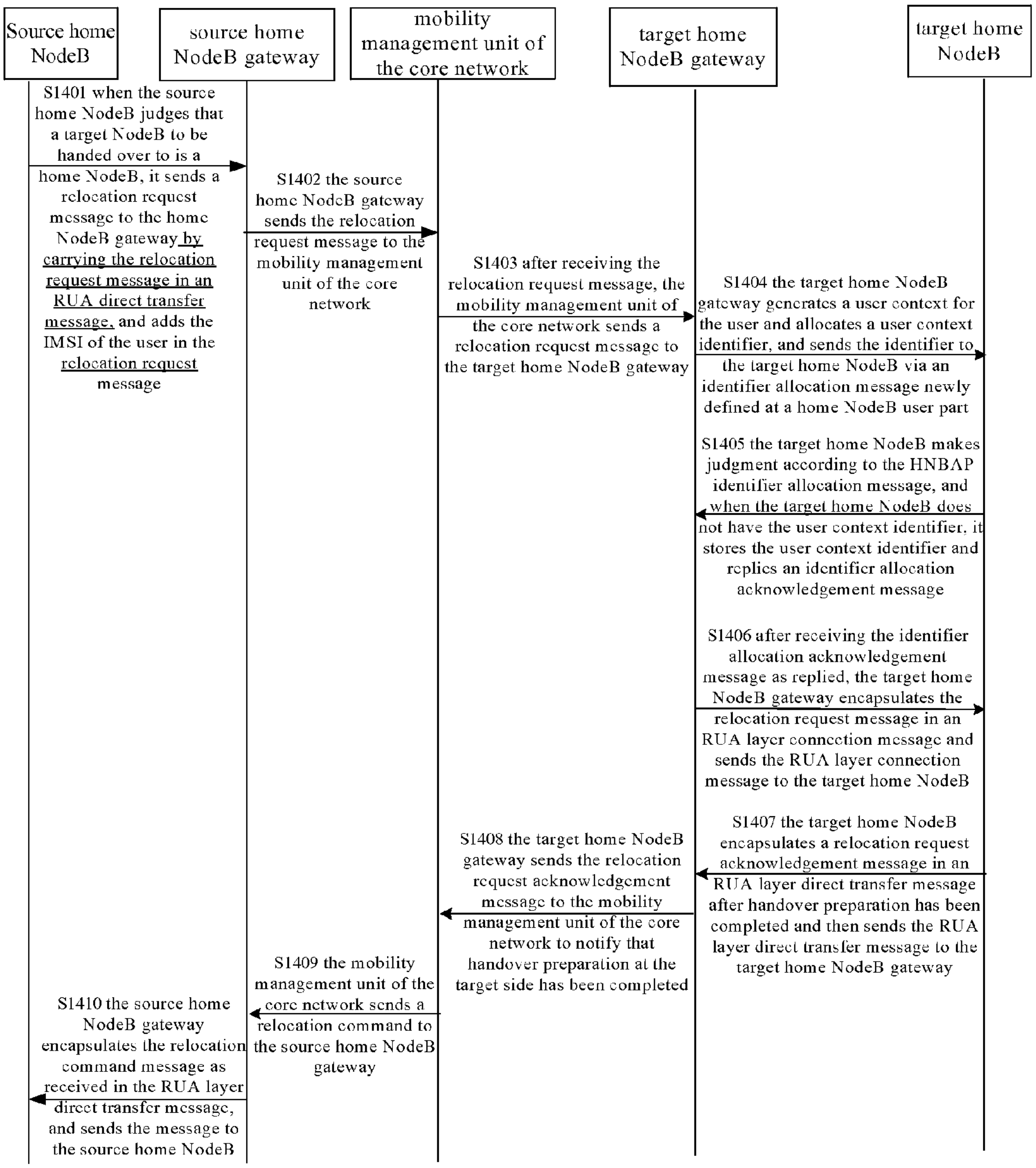
FIG. 14 is a flow chart of a method for a user handing over to a home NodeB provided by embodiment 11 of the present invention.

FIG. 14 is a flow chart of a method for a user handing over to a home NodeB provided by embodiment 11 of the present invention, and as shown in FIG. 14, the flow chart comprises the steps S1401 to S1410 as follows.

Step S1401, a source home NodeB judges to initiate a handover flow according to a measurement report reported by the user, and when the source home NodeB is able to judge that a target NodeB to be handed over to is a home NodeB according to the configuration information of the target NodeB to be handed over to, it adds the permanent identifier IMSI of the user in a relocation request message in an RUA direct transfer message sent to a source home NodeB gateway. In the above, the relocation request message also carries information such as a target NodeB identifier.

Step S1402, the source home NodeB gateway receives the RUA direct transfer message, and sends the relocation request message therein to the mobility management unit of the core network.

Step S1403, after receiving the relocation request message, the mobility management unit of the core network sends the relocation request message to the target home NodeB gateway.

Step S1404, the target home NodeB gateway performs search according to the user permanent identifier IMSI in the relocation request message, if it finds that the user has not performed registration, it generates a user context for the user and allocates a user context identifier, and sends the identifier to the target home NodeB via an identifier allocation message newly defined at an HNBAP layer.

Step S1405, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S1406, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S1407, the target home NodeB receives the RUA connection message, and encapsulates a relocation request acknowledgement message in an RUA direct transfer message after handover preparation has been completed and then sends the RUA direct transfer message to the target home NodeB gateway. In the above, the RUA direct transfer message carries a user context identifier already allocated for distinguishing the message.

Step S1408, the target home NodeB gateway sends the relocation request acknowledgement message to the mobility management unit of the core network to notify that handover preparation at the target side has been completed.

Step S1409, the mobility management unit of the core network sends a relocation command to the source home NodeB gateway.

Step S1410, the source home NodeB gateway encapsulates the relocation command message as received in the RUA direct transfer message, and sends the message to the source home NodeB to trigger the source home NodeB to initiate a synchronization process from the user to the target home NodeB.

Figure 15:
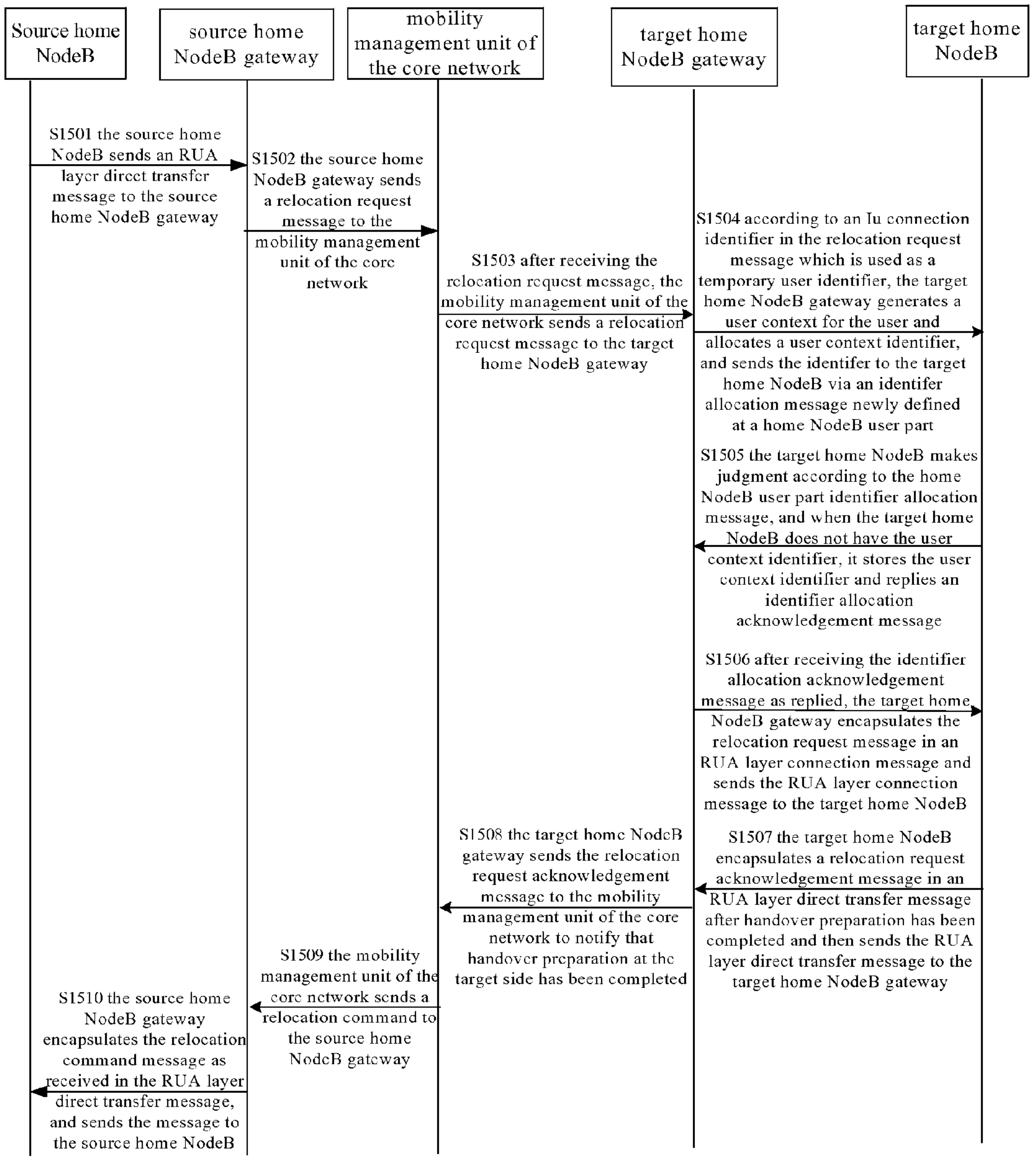
FIG. 15 is a flow chart of a method for a user handing over to a home NodeB provided by embodiment 12 of the present invention.

FIG. 15 is a flow chart of a method for a user handing over to a home NodeB provided by embodiment 12 of the present invention, and as shown in FIG. 15, the flow chart comprises the steps S1501 to S1510 as follows.

Step S1501, a source home NodeB judges to initiate a handover flow according to a measurement report reported by the user and sends an RUA direct transfer message to a source home NodeB gateway, wherein the RUA direct transfer message encapsulates therein an RANAP message which contains therein a relocation request message. In the above, the relocation request message carries information such as a target NodeB identifier.

Step S1502, the source home NodeB gateway receives the RUA direct transfer message, and sends the relocation request message therein to the mobility management unit of the core network.

Step S1503, after receiving the relocation request message, the mobility management unit of the core network sends the relocation request message to the target home NodeB gateway according to the target NodeB identifier information carried in the relocation request message.

Step S1504, by using an Iu connection identifier in the relocation request message as a temporary user identifier, the target home NodeB gateway generates a user context for the user and allocates a user context identifier, and sends the identifier to the target home NodeB via an identifier allocation message newly defined at an HNBAP layer.

Step S1505, the target home NodeB receives the HNBAP identifier allocation message and makes judgment according to the user context identifier in the message, and when the target home NodeB does not have the user context identifier, it stores the user context identifier as received and replies an identifier allocation acknowledgement message to the target home NodeB gateway.

Step S1506, after receiving the identifier allocation acknowledgement message, the target home NodeB gateway encapsulates the relocation request message in an RUA connection message and sends the RUA connection message to the target home NodeB. In the above, the RUA connection message carries a user context identifier already allocated for distinguishing the message.

Step S1507, the target home NodeB receives the RUA connection message, and encapsulates a relocation request acknowledgement message in an RUA direct transfer message after handover preparation has been completed and then sends the RUA connection message to the target home NodeB gateway. In the above, the RUA direct transfer message carries a user context identifier already allocated for distinguishing the message.

Step S1508, the target home NodeB gateway sends the relocation request acknowledgement message to the mobility management unit of the core network to notify that handover preparation at the target side has been completed.

Step S1509, the mobility management unit of the core network sends a relocation command to the source home NodeB gateway.

Step S1510, the source home NodeB gateway encapsulates the relocation command message as received in the RUA direct transfer message, and sends the message to the source home NodeB to trigger the source home NodeB to initiate a synchronization process from the user to the target home NodeB.

The above method described in the embodiments of the present invention successfully solves the following problem: when a user performs cell handover, if a target NodeB to be handed over to is a home NodeB, signaling messages between the home NodeB and a home NodeB gateway cannot be corresponded as the home NodeB gateway lacks a user context identifier, and thus the handover procedure cannot be successfully performed.

Figure 16:
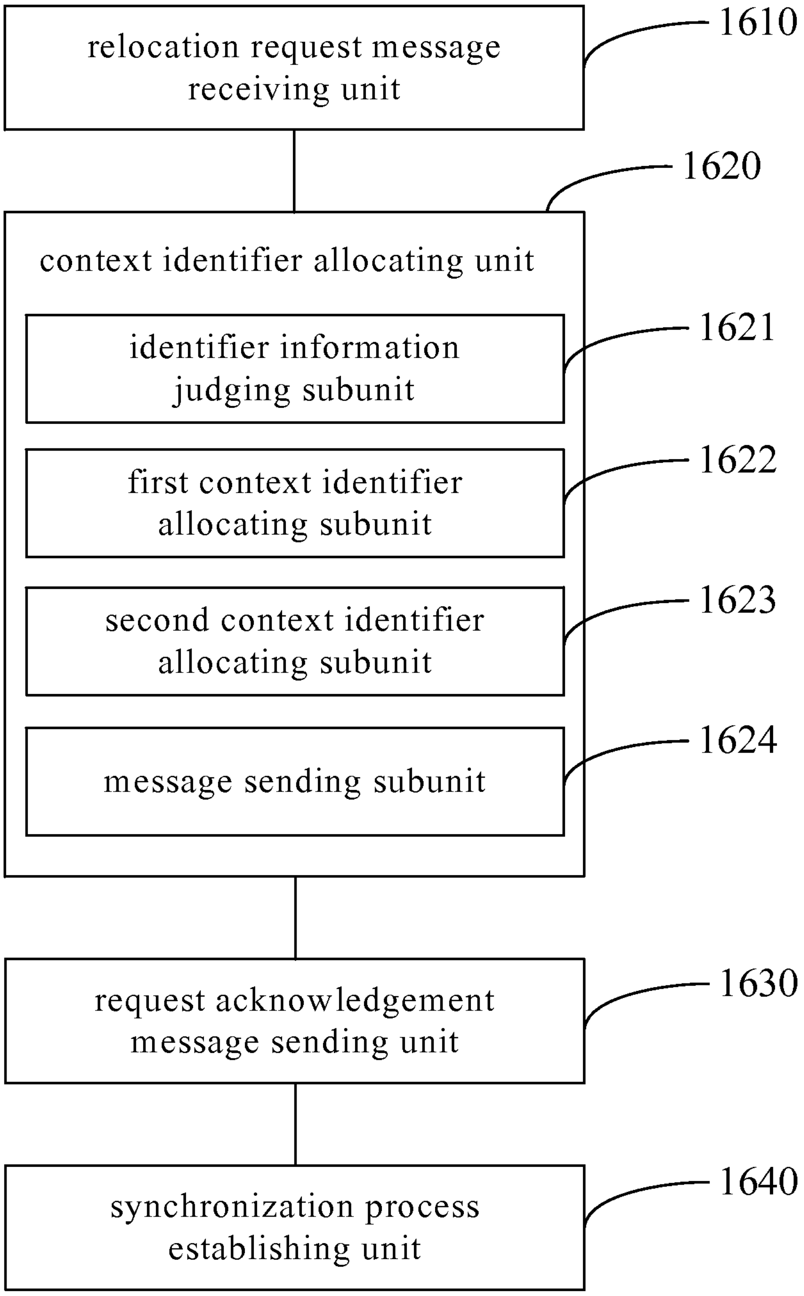
FIG. 16 is a block diagram of an apparatus for a user handing over to a home NodeB provided by an embodiment of the present invention.

FIG. 16 is a block diagram of the structure of an apparatus for a user handing over to a home NodeB provided by an embodiment of the present invention, and as shown in FIG. 16, the apparatus comprises: a relocation request message receiving unit 1610, a context identifier allocating unit 1620 and a request acknowledgement message sending unit 1630.

The relocation request message receiving unit 1610 is configured to receive, when a user initiates a handover procedure from a source NodeB to a target home NodeB, a relocation request message sent from a mobility management unit of the core network to which the source NodeB belongs; the context identifier allocating unit 1620 is configured to generate a user context for the user according to the relocation request message received by the relocation reuqest message receiving unit 1610, allocate a user context identifier for the user context, and send the user context identifier and the relocation request message to the target home NodeB for processing; and the request acknowledgement message sending unit 1630 is configured to send a relocation request acknowledgement message to the mobility management unit of the core network when the relocation request acknowledgement message replied by the target home NodeB is received.

In the above, the context identifier allocating unit 1620 further comprises: an identifier information judging subunit 1621, the first context identifier allocating subunit 1622, the second context identifier allocating subunit 1623 and a message sending subunit 1624.

In the above, the identifier information judging subunit 1621 is configured to perform judgment according to the relocation request message sent from the relocation request message sending unit 1610, trigger the first context identifier allocating subunit 1622 when the relocation request message carries a user permanent identifier, and trigger the second context identifier allocating subunit 1623 when the relocation request message does not carry a user permanent identifier; the first context identifier allocating subunit 1622 is configured to perform search according to the user permanent identifier in the relocation request message, and generate the user context for the user if the user has not performed registration and allocate the user context identifier for the user context; the second context identifier allocating subunit 1623 is configured to generate the user context for the user by using an Iu connection identifier in the relocation request message as a temporary user identifier and allocate the user context identifier for the user context; and the message sending subunit 1624 is configured to send the user context identifier and the relocation request message to the target home NodeB for processing.

The apparatus provided by the present invention further comprises: a synchronization process establishing unit 1640 which is configured to send a relocation command via the mobility management unit of the core network to trigger the source NodeB to initiate a synchronization process from the user to the target home NodeB.

The apparatus provided by the present invention solves the following problem: when a user performs cell handover, if a target NodeB to be handed over to is a home NodeB, signaling messages between the home NodeB and a home NodeB gateway cannot be corresponded as the home NodeB gateway lacks a user context identifier, and thus the handover procedure cannot be successfully performed.

Obviously, one skilled in the art can make various changes and deformations to the present invention without departing from the spirit and scope of the present invention. Hence, if such changes and deformations of the present invention fall within the scope of the claims of the present invention and equivalent technologies thereof, the present invention also intends to contain such changes and deformations.

The invention claimed is:

1. A method for a user handing over to a home NodeB, the method comprising the following steps:

A. when the user initiates a handover procedure from a source NodeB to a target home NodeB, a target home NodeB gateway receives a relocation request message from a mobility management unit of a core network;

B. the target home NodeB gateway generates a user context for the user according to the relocation request message, allocating a user context identifier for the user context, and sends the user context identifier and the relocation request message to the target home NodeB; and C. when the target home NodeB gateway receives a relocation request acknowledgement message replied by the target home NodeB, the target home NodeB gateway sends the relocation request acknowledgement message to the mobility management unit of the core network.

2. The method according to claim 1, wherein step A comprises:

the source NodeB initiating the handover procedure according to a measurement report reported by the user;

when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway; and the mobility management unit of the core network sends the relocation request message, which carries a user permanent identifier added by the mobility management unit of the core network, to the target home NodeB gateway according to the relocation request message.

3. The method according to claim 2, wherein in step B, the step of sending the user context identifier and the relocation request message to the target home NodeB comprises:

the target home NodeB gateway encapsulating the user context identifier information and the relocation request message in a radio access network application part user adaptation (RUA) connection message and sends the RUA connection message to the target home NodeB; or the target home NodeB gateway sends the user context identifier information to the target home NodeB via identifier allocation information newly defined at a home NodeB application protocol layer, encapsulating the relocation request message in an RUA connection message after receiving an identifier allocation acknowledgement message replied by the target home NodeB, and then sends the RUA connection message to the target home NodeB.

4. The method according to claim 1, wherein step A comprises:

the source NodeB initiating the handover procedure according to a measurement report reported by the user;

when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway, wherein the relocation request message carries a user permanent identifier added by the source NodeB; and the mobility management unit of the core network sends the relocation request message to the target home NodeB gateway according to the received relocation request message.

5. The method according to claim 2, wherein in step B, the step of generating a user context for the user according to the relocation request message and allocating a user context identifier for the user context comprises:

when the relocation request message carries the user permanent identifier, searching according to the user permanent identifier in the relocation request message, if the user has not performed registration, then generating the user context for the user, and allocating the user context identifier for the user context.

6. The method according to claim 4, wherein in step B, the step of generating a user context for the user according to the relocation request message and allocating a user context identifier for the user context comprises:

when the relocation request message carries the user permanent identifier, searching according to the user permanent identifier in the relocation request message, if the user has not performed registration, then generates the user context for the user, and allocating the user context identifier for the user context.

7. The method according to claim 4, wherein in step B, the step of sending the user context identifier and the relocation request message to the target home NodeB comprises:

the target home NodeB gateway encapsulating the user context identifier information and the relocation request message in a radio access network application part user adaptation (RUA) connection message and sends the RUA connection message to the target home NodeB; or the target home NodeB gateway sends the user context identifier information to the target home NodeB via identifier allocation information newly defined at a home NodeB application protocol layer, encapsulating the relocation request message in an RUA connection message after receiving an identifier allocation acknowledgement message replied by the target home NodeB, and then sends the RUA connection message to the target home NodeB.

8. The method according to claim 1, wherein step A comprises:

the source NodeB initiating the handover procedure according to a measurement report reported by the user;

when the source NodeB is a macro base station, the source NodeB directly sends a relocation request message to the mobility management unit of the core network, and when the source NodeB is a home NodeB, the source NodeB sends a relocation request message to the mobiltiy management unit of the core network via a home NodeB gateway; and the mobility management unit of the core network sends the relocation request message to the target home NodeB gateway according to the received relocation request message.

9. The method according to claim 8, wherein in step B, the step of generating a user context for the user according to the relocation request message and allocating a user context identifier for the user context comprises:

when the relocation request message does not carry a user permanent identifier, generating the user context for the user by using an Iu connection identifier in the relocation request message as a temporary user identifier, and allocating the user context identifier for the user context.

10. The method according to claim 8, wherein in step B, the step of sending the user context identifier and the relocation request message to the target home NodeB comprises:

the target home NodeB gateway encapsulating the user context identifier information and the relocation request message in a radio access network application part user adaptation (RUA) connection message and sends the RUA connection message to the target home NodeB; or the target home NodeB gateway sends the user context identifier information to the target home NodeB via identifier allocation information newly defined at a home NodeB application protocol layer, encapsulating the relocation request message in an RUA connection message after receiving an identifier allocation acknowledgement message replied by the target home NodeB, and then sends the RUA connection message to the target home NodeB.

11. The method according to claim 1, wherein in step B, the step of sending the user context identifier and the relocation request message to the target home NodeB comprises:

the target home NodeB gateway encapsulating the user context identifier information and the relocation request message in a radio access network application part user adaptation (RUA) connection message and sends the RUA connection message to the target home NodeB; or the target home NodeB gateway sends the user context identifier information to the target home NodeB via identifier allocation information newly defined at a home NodeB application protocol layer, encapsulating the relocation request message in an RUA connection message after receiving an identifier allocation acknowledgement message replied by the target home NodeB, and then sends the RUA connection message to the target home NodeB.

12. The method according to claim 1, wherein after step C, the method further comprises:

the mobility management unit of the core network sends a relocation command to trigger the source NodeB to initiate a synchronization process from the user to the target home NodeB.

13. An apparatus for a user handing over to a home NodeB, the apparatus comprising:

a memory which stores a relocation request message receiving unit, a context identifier allocating unit, and a request acknowledgement message sending unit;

a processor which is coupled to the memory; wherein the processor executes the relocation request message receiving unit performs the follow: the relocation request message receiving unit receives, when a user initiates a handover procedure from a source NodeB to a target home NodeB, a relocation request message sent from a mobility management unit of a core network to which the source NodeB belongs;

the processor executes the context identifier allocating unit performs the follow: the context identifier allocating unit generates a user context for the user according to the relocation request message received by the relocation request message receiving unit, allocates a user context identifier for the user context, and sends the user context identifier and the relocation request message to the target home NodeB for processing; and the processor executes the request acknowledgement message sending unit performs the follow: the request acknowledgement message sending unit sends a relocation request acknowledgement message to the mobility management unit of the core network when the relocation request acknowledgement message replied by the target home NodeB is received.

14. The apparatus according to claim 13, wherein the context identifier allocating unit further comprises: an identifier information judging subunit, a first context identifier allocating subunit, a second context identifier allocating subunit and a message sending subunit, wherein, the processor executes the identifier information judging subunit performs the follow: the identifier information judging subunit performs judgment according to the relocation request message sent from the relocation request message sending unit, triggers the first context identifier allocating subunit when the relocation request message carries a user permanent identifier, and triggers the second context identifier allocating subunit when the relocation request message does not carry a user permanent identifier;

the processor executes the first context identifier allocating subunit performs the follow: the first context identifier allocating subunit performs search according to the user permanent identifier in the relocation request message, and generates the user context for the user if the user has not performed registration and allocate the user context identifier for the user context;

the processor executes the second context identifier allocating subunit performs the follow: the second context identifier allocating subunit generates the user context for the user by using an Iu connection identifier in the relocation request message as a temporary user identifier and allocates the user context identifier for the user context; and the processor executes the message sending subunit performs the follow: the message sending subunit sends the user context identifier and the relocation request message to the target home NodeB for processing.

15. The apparatus according to claim 13, wherein the memory further stores a synchronization process establishing unit, and the processor executes the synchronization process establishing unit performs the follow:

the synchronization process establishing unit sends a relocation command via the mobility management unit of the core network to trigger the source NodeB to initiate a synchronization process from the user to the target home NodeB.

* * * * *